United States Patent
Balfe et al.

(10) Patent No.: US 7,908,560 B2
(45) Date of Patent: Mar. 15, 2011

(54) METHOD AND SYSTEM FOR CROSS-SCREEN COMPONENT COMMUNICATION IN DYNAMICALLY CREATED COMPOSITE APPLICATIONS

(75) Inventors: Robert A. Balfe, Whitesboro, NY (US); Charles P. Imperato, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 911 days.

(21) Appl. No.: 11/739,624

(22) Filed: Apr. 24, 2007

(65) Prior Publication Data

US 2008/0270944 A1 Oct. 30, 2008

(51) Int. Cl.
*G06F 3/00* (2006.01)

(52) U.S. Cl. ......... 715/762; 715/209; 717/104; 717/110

(58) Field of Classification Search .................. 715/848, 715/209, 210, 762; 717/104, 105, 107, 108, 717/110, 120; 709/227, 230
See application file for complete search history.

(56) References Cited

U.S. PATENT DOCUMENTS

| | | | |
|---|---|---|---|
| 7,512,696 B1 * | 3/2009 | Ruble et al. ................. 709/230 |
| 2005/0256882 A1 * | 11/2005 | Able et al. ..................... 707/10 |
| 2006/0041502 A1 * | 2/2006 | Blair et al. ..................... 705/37 |
| 2006/0041503 A1 * | 2/2006 | Blair et al. ..................... 705/37 |
| 2006/0041518 A1 * | 2/2006 | Blair et al. ..................... 705/80 |
| 2006/0041840 A1 * | 2/2006 | Blair et al. ..................... 715/513 |
| 2006/0074980 A1 * | 4/2006 | Sarkar ......................... 707/104.1 |
| 2006/0165040 A1 * | 7/2006 | Rathod et al. ................. 370/335 |
| 2006/0282516 A1 * | 12/2006 | Taylor et al. .................. 709/220 |
| 2007/0011334 A1 * | 1/2007 | Higgins et al. ................ 709/227 |
| 2007/0033196 A1 * | 2/2007 | Moore ............................. 707/10 |
| 2007/0033571 A1 * | 2/2007 | Moore et al. .................. 717/104 |
| 2007/0067373 A1 * | 3/2007 | Higgins et al. ................ 707/206 |
| 2007/0111179 A1 * | 5/2007 | Hochwarth et al. .......... 434/350 |
| 2007/0111181 A1 * | 5/2007 | Hochwarth et al. .......... 434/350 |
| 2007/0162456 A1 * | 7/2007 | Agassi et al. .................. 707/10 |
| 2008/0082575 A1 * | 4/2008 | Peter et al. .................. 707/103 Z |
| 2008/0161940 A1 * | 7/2008 | Gerwens et al. ................. 700/4 |
| 2008/0163218 A1 * | 7/2008 | Ostermeier et al. .......... 718/101 |
| 2008/0244517 A1 * | 10/2008 | Rostoker ...................... 717/120 |

OTHER PUBLICATIONS

Roy-Chowdhury, Developing JSR 168 compliant cooperative portlets, International Business Machines Corporation 2004, pp. 1-28.

* cited by examiner

*Primary Examiner* — Ba Huynh
(74) *Attorney, Agent, or Firm* — David A. Dagg

(57) ABSTRACT

A method and system for cross-screen component communication in dynamically created composite applications. Metadata in the mark-up for a source component (e.g. eXtensible Markup Language—XML information) in a dynamically created composite application includes indications of which screens target components are located on. These indications are contained in definitions of logical connections established between components referred to as "cross-page wire" definitions. Executable objects, referred to as "cross-page wire" executable objects, are generated based on the cross-page wire definitions in the source component mark-up. The cross-page wire executable objects are executed by a run-time entity, such as a "property broker" or the like, in response to a change in a property value for which the cross-page wire has been defined, in order to deliver a new value of that property to one or more target components located on screens different from the screen on which the source component is located.

19 Claims, 6 Drawing Sheets

METHOD AND SYSTEM FOR CROSS-SCREEN COMPONENT COMMUNICATION IN DYNAMICALLY CREATED COMPOSITE APPLICATIONS

FIELD OF THE INVENTION

This present invention relates generally to dynamic creation of application computer software, and more specifically to a method and system for cross-screen component communication in dynamically created composite applications.

BACKGROUND OF THE INVENTION

As it is generally known, computer application software typically provides the software-based functions that are exposed directly to a computer system end user. For purposes herein, a software application program is any program or group of programs that are used by an end user. Software applications are also sometimes referred to as "end-user programs", and may provide such capabilities as Web browsing, electronic mail, instant messaging, database searching, word processing, electronic spreadsheets, and others.

In many situations, it is desirable to dynamically create composite application programs that re-use components that have previously been designed, developed and installed. Software components available for use in a composite application are typically relatively small binary objects or programs that perform specific functions, and are designed such that they can easily operate with other components and/or applications. One example of software components that are often available for use in a composite application programs are programs known as "widgets". The term "widget" usually refers to a software component that is operable to generate a corresponding graphical user interface display object. The appearance a widget display object typically depends on actions taken by an end-user while interfacing with the GUI. Accordingly, a widget may allow the end-user to interface with an underlying application of which it is a part. Examples of widgets include buttons, dialog boxes, pop-up windows, pull-down menus, icons, scroll bars, resizable window edges, progress indicators, selection boxes, windows, tear-off menus, menu bars, toggle switches and forms. One well known widget set is the Standard Widget Toolbox (SWT), which is a graphical widget toolkit for the Java platform originally developed by IBM and maintained now by the Eclipse Foundation in tandem with the Eclipse IDE (Integrated Development Environment). Other examples of components that may be used within composite applications include COM (Component Object Model) software objects, and Portlets, which are pluggable user interface components that are managed and displayed in a Web portal.

It is often desirable to provide inter-component communication within dynamically created composite application programs. Previous systems have provided some assistance in this regard. One example of such previous systems is described in the article "Developing JSR 168 Compliant Cooperative Portlets", by Amber Roy-Chowdhury and Yuping Connie Wu, published in November, 2004. That article describes a technique that enables a portlet to share information with other portlets located in the same portal page, even when the cooperating portlets are independently developed, through a run-time entity referred to as a "property broker". Instances of cooperative portlets within a portal page share property values by way of logical associations referred to as "wires" that connect them. Wires are created using a software program referred to as a "wiring tool", after the portlets have been deployed.

A significant area not addressed by previous systems regards conveniently providing for communication within a dynamically created composite application between portlets or other types of components that are located on different screens (e.g. different pages). Accordingly, it would be desirable to have a new system that includes a mechanism for providing cross-screen inter-component communication in a dynamically created composite application.

SUMMARY OF THE INVENTION

To address the above described and other shortcomings of previous approaches, a new method and system are disclosed for cross-screen component communication in dynamically created composite applications. In the disclosed system, meta-data in mark-up for a source component (e.g. eXtensible Markup Language—XML information) includes indications of which screens target components are located on. These indications are contained in user defined logical connections between components referred to herein as "cross-page wire" definitions. Upon loading of the composite application for execution, cross-page wire executable objects are created and registered based on the cross-page wire definitions in the source component mark-up.

At run time, the cross-page wire executable objects are executed by a run-time entity, such as a "property broker" or the like, in response to changes in property values, in order to deliver new property values to target components located on screens different from the screen on which the source component is located. Target component screen indications are used when the cross-page wire objects are executed to identify the screens on which the target components are located for delivery of the property values from the source component. The property broker run-time entity determines the appropriate target screen for the target component, switches the current user interface from the source screen to the target screen, such that the target screen obscures (e.g. completely obscures) the source screen, and delivers the updated value of the property to the target component within the target screen. The target component processes the received property value and makes any resulting visual changes to the display object for the target component in the target screen.

The disclosed system further provides a composite application editor tool or the like through which a user can create cross-page wire definitions. The composite application editor enables the user to indicate the screens on which specific target component instances are located for each cross-page wire that is defined by the user.

In one embodiment, the component mark-up of the disclosed system is XML including meta-data designed in accordance with the Eclipse Rich Client IDE platform. In such an embodiment, the property broker run time entity calls into a composite application infrastructure (CAI) topology handler to locate any new Eclipse perspective that is to be activated as the target screen for a target component when a property value is updated in that target component. During a property change event, when the property broker executes a cross-page wire object, a new screen corresponding to the new Eclipse perspective is activated, and the property change event is sent to a receiving action in the target component in the new screen.

Thus there is disclosed a new system that conveniently provides user defined communication links between previously deployed components in a dynamically created composite application, in which the connected components may be located on different screens (e.g. pages).

BRIEF DESCRIPTION OF THE DRAWINGS

In order to facilitate a fuller understanding of the present invention, reference is now made to the appended drawings. These drawings should not be construed as limiting the present invention, but are intended to be exemplary only.

DETAILED DESCRIPTION OF EXEMPLARY EMBODIMENTS

Figure 1:
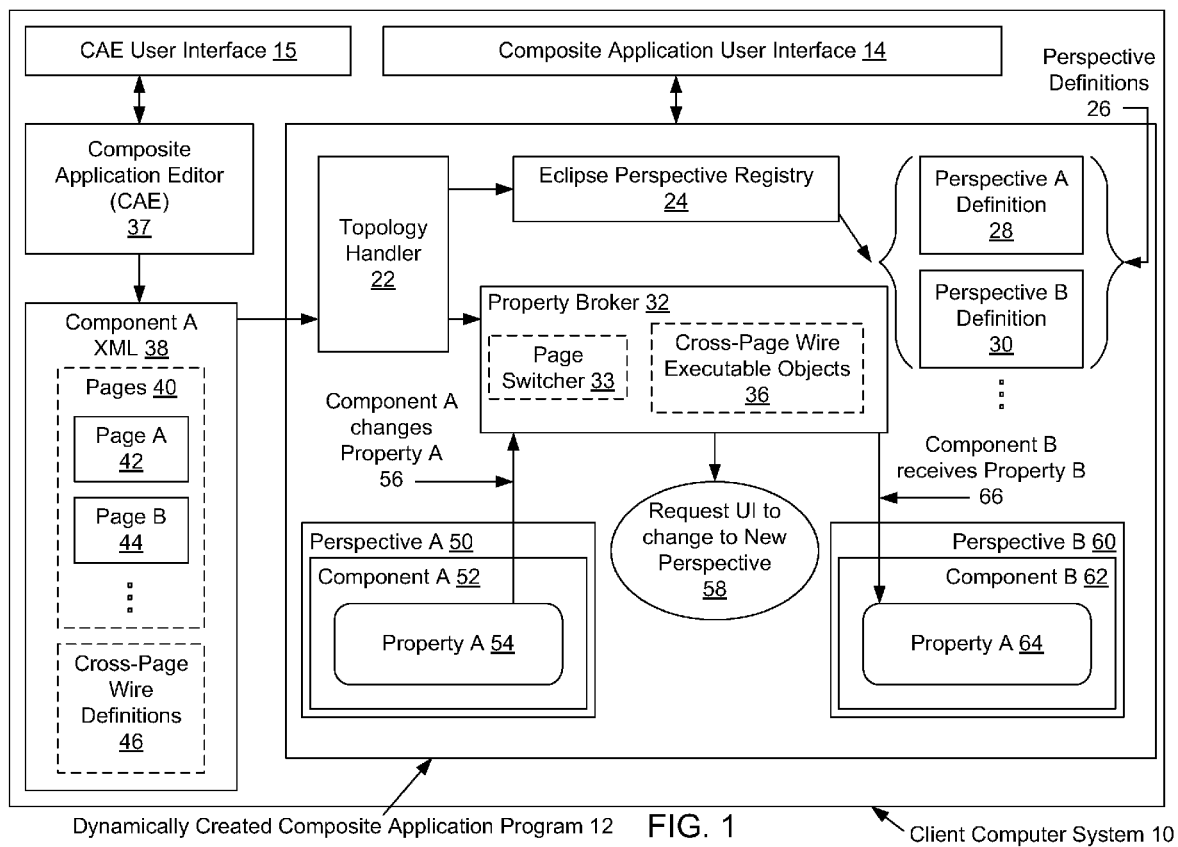
FIG. 1 is a block diagram showing features of an illustrative embodiment of the disclosed system.

As shown in FIG. 1, an illustrative embodiment of the disclosed system includes a client computer system 10 on which a dynamically created composite application program 12 may be loaded and executed. The composite application program 12 generates the composite application user interface 14 for a local user as part of a graphical user interface provided on a display device of the client computer system 10. The composite application program 12 is shown including a topology handler 22, an Eclipse perspective registry 24, and a property broker 32 that includes a page switcher 33 and a number of cross-page wire executable objects 36. The Eclipse perspective registry 24 has access to or contains a number of perspective definitions 26, shown for purposes of illustration including perspective A definition 28, perspective B definition 30, etc. Once the perspective definitions 26 are registered, e.g. when the composite application program 12 is executed, they are made visible in the composite application user interface 14 either when they are navigated to by a user, or when a property change event is propagated through the property broker 32 by way of execution of one of the a cross-page wire executable objects 36.

Also shown in FIG. 1 is a composite application editor (CAE) that provides a CAE user interface 15 to a user of the client computer system 10, also as part of the graphical user interface provided through a display device of the client computer system 10. Based on information received from the user through the CAE user interface 15, the composite application editor 37 operates to generate component A XML 38, which is an example of mark-up generated by the disclosed system for a component that is part of the composite application program 12 (i.e. component A 52). The component A XML 38 is shown including a number of pages 40, shown for purposes of illustration as including page A 42, page B 44, etc. The pages 40 are examples of screens on which components in the composite application program 12 may be located. The pages 40 are used to create corresponding perspectives within the perspective definitions 26 for use in providing the composite application user interface 14 when the composite application program 12 is executed.

Component A XML 38 further includes meta-data defining a number of user defined cross-screen component connections, shown as cross-page wire definitions 46. The component A XML 38 further includes screen layout information indicating where specific components are located within the pages 40, and any cross-page wire information that may be needed by the property broker 32 to convey properties at run time between components on different pages in the composite application program 12.

The illustrative composite application program 12 of FIG. 1 further includes a first software component A 52, and a second software component B 62. Component A 52 and component B 62 may be any specific type of component, including but not limited to widgets, COM (Component Object Model) software objects, and/or Portlets. Component A 52 is part of perspective A 50, and component B 62 is part of perspective B 60. Perspective A 50 and perspective B 60 may be any specific type of perspective or view that may be registered in the perspective registry 24, including but not limited to Web pages, tabbed display objects displayed within a tabbed user interface of the composite application program 12, and/or documents that can be loaded within the composite application program 12.

During operation of the illustrative embodiment shown in FIG. 1, when component A 52 changes 56 a current value of property A 54, property broker 32 detects the change, and determines which of the cross-page wire executable objects 36 is associated with changes to property A 54 in component A 52. The property broker 32 then executes the cross-page wire executable object associated with changes to property A 54. The cross-page wire executable object associated with changes to property A 54 determines which target components on which target screens are to be sent the new value of property A 54 from component A 52. For example, the cross-page wire executable object associated with changes to property A 54 in component A 52 in perspective A 50 may determine that the new value of property A 54 is to be passed to component B 62 in perspective B 60. In that case, the cross-page wire executable object associated with changes to property A 54 causes the property broker 32 to request 58 that the user interface 14 be changed so that a new perspective from the perspectives registered in the perspective registry 24 is displayed within the composite application user interface 14. Displaying of the new perspective by the disclosed system causes the previous perspective and the source component to be obscured. The changing of the current perspective may, for example, be performed by a page switcher 33 contained within the property broker 32. In the example of FIG. 1, the new perspective is perspective B 60, which includes component B 62. Thus perspective B 60 is the target perspective, and component B 62 is the target component for the new value of property A 54.

The new value of property A 53 is then passed by the property broker 32 to component B 62, as shown by property A 64 in component B 62. Component B 62 then operates to process property A 64, for example by changing a visual display object for component B 62 in the composite application user interface 14.

As will be recognized by those skilled in the art, the client computer system 10 of FIG. 1 may be communicably connected, for example by way of a communication network such as the Internet, a Local Area Network (LAN), or other specific type of communication network, to one or more server systems in a client-server configuration. The composite application program 12 and/or composite application editor 37 may, for example, accordingly use a client-server approach to operating with server application software executing on one or more such server computer systems to provide portions of the application user interfaces 14 and 15.

The client computer system 10 may further include at least one processor, program storage, such as memory, for storing program code executable on the processor, and one or more input/output devices and/or interfaces, such as data communication and/or peripheral devices and/or interfaces. The client computer system 10 may also include appropriate operating system software.

Figure 2:
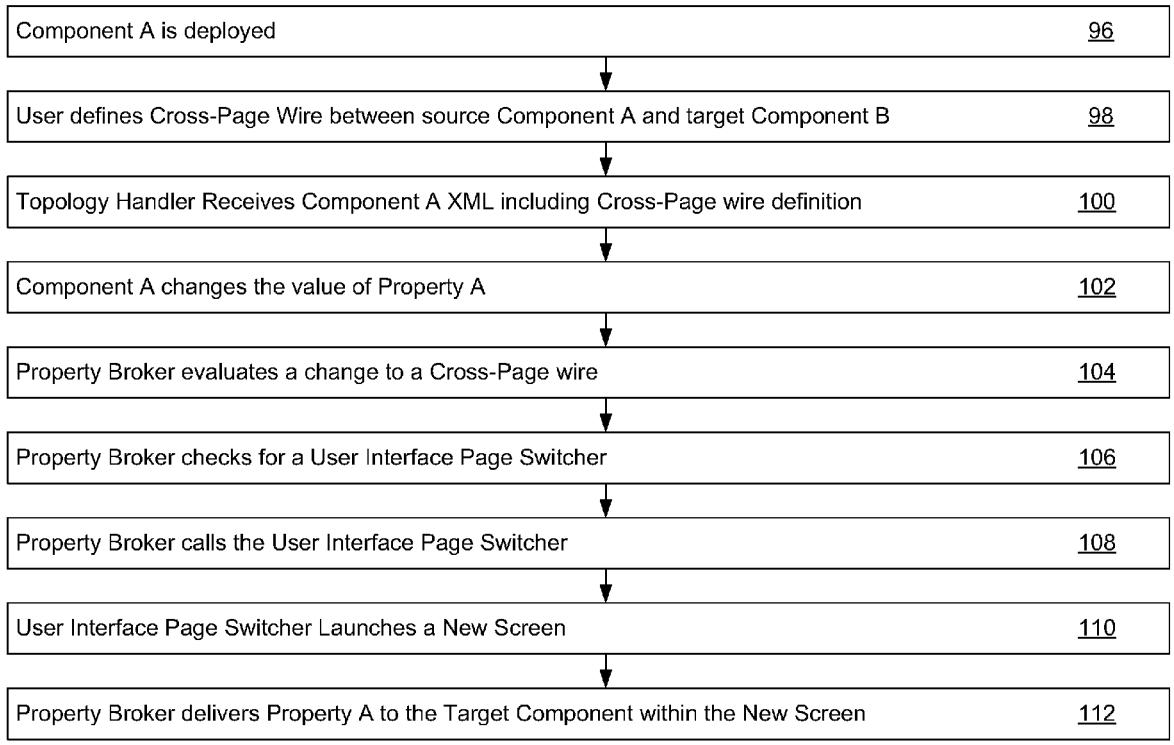
FIG. 2 is a flow chart showing steps performed during operation of an illustrative embodiment of the disclosed system.

FIG. 2 is a flow chart showing steps performed during operation of an illustrative embodiment of the disclosed system. As shown in FIG. 2, at step 96 component A is deployed and made available for use in a dynamically created composite application program. The dynamically created composite applications for which the disclosed system may be created by end users and/or application developers. Advantageously, the disclosed system enables an end user to re-use a component from a first, previously installed application program, in another dynamically created composite application program created by the user to meet the user's specific needs. For example, a user may re-use a component from a previously deployed calendar application program, such as the component sometimes referred to as a "date-picker" component, and re-use that component for date selection in a dynamically created composite application program created by and for that end user. The disclosed system may alternatively be used by a composite application developer creating composite applications for use by other users. In either case, the user-defined cross-page wires of the disclosed system may be defined after installation of the source and target components, for passing values between properties having the same type, during execution of dynamically created composite application at run time.

At step 98, a user defines a cross-page wire in which component A is a source component, and component B is a target component. Component A is part of a first user interface screen (e.g. "Web page A"), while component B is part of a second user interface screen (e.g. "Web page B"). The definition performed at step 98 may be done through a user interface display object generated by an application program capable of creating cross-page wires in response to user inputs, such as the CAE 37 shown in FIG. 1. The cross-page wire definition performed at step 98 may, for example, be done by an administrator or an end user, depending on their access level with regard to the composite application in which the cross-page wire is to be defined.

During step 98, the user provides identifiers of the source component, the source screen on which the source component is located, the target component, and the target screen on which the target component is located. The mark-up generated at step 98 includes meta-data defining the cross-page wire defined at step 98. The mark-up and meta-data therein may, for example, consist of XML code associated with component A.

While in one embodiment of the disclosed system the source screen and target screens are Web pages, the disclosed system is not limited to such an embodiment. Accordingly, the source and target screens of the disclosed system may alternatively be embodied as any specific type of user interface screens presented by an application. Such user interface screens may, for example, each expose a different document currently opened to the user within the composite application. For example, in the case of an electronic spreadsheet composite application, such opened document specific screens might each expose different open spreadsheet document to a user of the electronic spreadsheet program. Further, in a tabbed graphical user interface, each screen may be associated with a corresponding tabbed user interface display object. For example, where each screen corresponds to a current opened document, each opened document specific screen may be available for selection by the user through the tabbed user interface, in which each screen is associated with a separate tab. Alternatively, each screen may be associated with a menu item in a pull-down menu or the like presented by the composite application. For example, each currently opened document may be presented in its own screen having its own selectable menu item within the pull-down menu. Each screen in the composite application user interface may alternative be user selectable through some other appropriate type of user interface selection mechanism.

In an embodiment of the disclosed system that provides cross-page wires between user interface screens corresponding to different, currently open documents, property values may accordingly be exchanged between the open documents displayed through such corresponding different screens.

At step 100, in response to the composite application containing component A being loaded for execution, for example in response to a user clicking on an associated icon or the like, the disclosed system sends the mark-up associated with component A to a topology hander run-time object, and the topology handler receives the mark-up for component A including the meta-data defining the cross-page wire connecting component A in screen A with component B in screen B. Further at step 100, the topology handler operates to register any screens (e.g. Web pages) indicated by cross-page wire definitions in the meta-data of the mark-up associated with component A. Such registration may, for example, include registering each such Web page as a perspective with an Eclipse perspective registry within the composite application program or within a run-time environment within which the composite application program executes.

Further at step 100, a number of cross-page wire executable objects (e.g. Java objects) are generated corresponding to the cross-page wire definitions in the meta-data of the mark-up associated with component A. Each such cross-page wire executable object is stored in the property broker for execution when a corresponding property change event occurs in response to a property value changing in component A when component A is a source component for that property in at least one such cross-page wire definition.

In one embodiment, step 100 is performed when the composite application is loaded or installed, such as when the user opens the application by double clicking on the corresponding icon or bookmark display object.

At step 102, the disclosed system detects a change in the value of a property for which component A is a source component in at least one cross-page wire. The cross-page wire executable object for that cross-page wire is executed as a result at step 104, causing the property broker to check at step 106 for a user interface page switcher that is operable to change a current screen in the user interface to the target screen on which the target component is located. At step 108 the disclosed system calls a user interface page switcher located at step 106 to change a current screen displayed in the user interface to the target screen on which the target component is located at step 110. In one embodiment, only one screen is visible at any given time in the application user interface (e.g. application window or the like) generated by the composite application. Accordingly, when the disclosed system changes the application user interface to display a new screen in response to a cross-page wire, the result is that the old screen is obscured by the new screen.

Finally, at step 112, the disclosed system passes the new value of the property to the target component in the target page at step 112.

Figure 3:
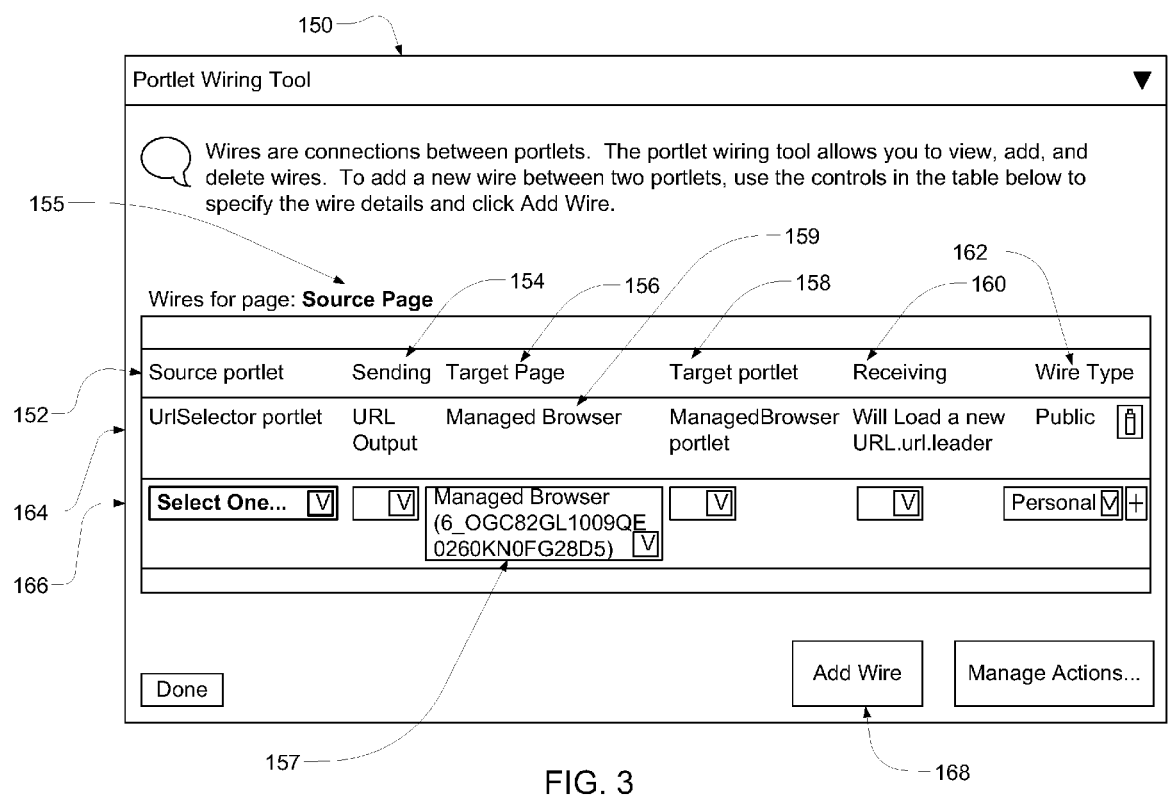
FIG. 3 is a simplified screen shot showing an example of a connection definition user interface display object generated by an illustrative embodiment of the disclosed system.

FIG. 3 is a simplified screen shot showing an example of a connection definition user interface display object 150 generated by an embodiment of the disclosed system. The display object 150 may, for example, be at least part of the CAE user interface 15 shown in FIG. 1. As shown in FIG. 3, the display object 150 includes a line 164 of selected cross-page wire definition information. The line 164 of selected information displays the results of a user manipulating selection objects (e.g. pull-down menus) in line 166 displayed below line 164. The selected options in line 164 describe a cross-page wire between a source portlet on the source page 155 (e.g. "SourcePage") and a target portlet located on a target page selected using the pull down menu 157. The target page selected using the pull down menu 157 may, for example, be any page contained in the composite application, and may be different from the source page 155. For example, as shown in FIG. 3, the currently selected target page is shown for purposes of illustration as "Managed Browser" 159.

The selected information in line 164 includes a column 152 for displaying a selected source portlet identifier, a column 154 for displaying selected sending parameter or action identifier for the property in the selected source portlet, a column 156 for displaying a selected target page identifier, a column 158 for displaying a selected a target portlet identifier, a column 160 for displaying a selected receiving parameter or action identifier for the target portlet, and a wire type indication for displaying whether the defined cross-page wire is public or private. The sending parameter or action identifier indicates either the name of a parameter in which the property value is found in the source component, or an action in the source component having an output that is the property value. Similarly, the receiving parameter or action identifier indicates either a name of a parameter for the property value in the target component, or an action in the target component to be passed the property value. When the user clicks on the "Add Wire" button 168, the information displayed in line 164 is used to created a cross-page wire definition to be associated with the source portlet identified in column 152.

Figure 4:
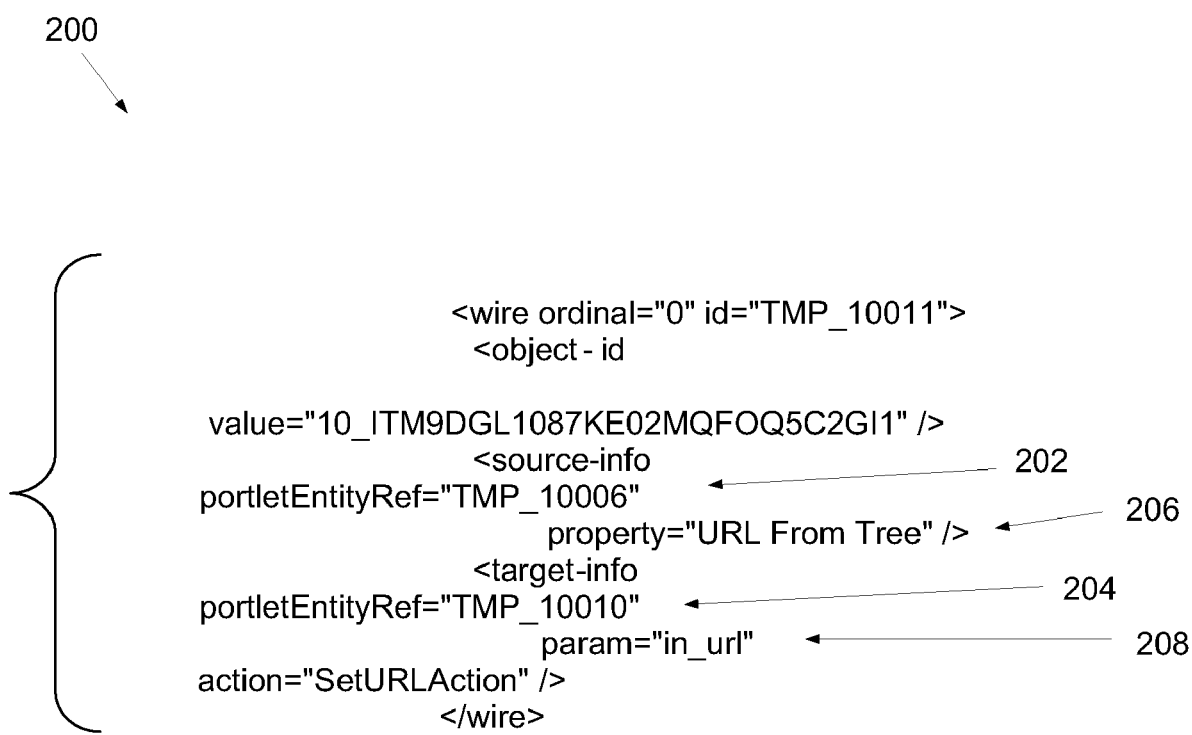
FIG. 4 is a code segment showing an example of mark-up defining a cross-screen connection in an illustrative embodiment of the disclosed system.

FIG. 4 is a code portion showing an example of mark-up 200 defining a cross-screen connection in an illustrative embodiment of the disclosed system. As shown in FIG. 4, portletEntityRef 202 for the source component is the exact instance identifier of the source component, while portletEntityRef 204 is the exact instance identifier of the target component. Because the components connected by the disclosed cross-page wires are component instances, each of the source and target instance identifiers can only be located on and/or associated with a single screen in the system. The property 206 is the identifier of the property that is being changed in the source component, while the param 208 is the identifier of the parameter to which the new property value is to be conveyed within the target component.

Figure 5:
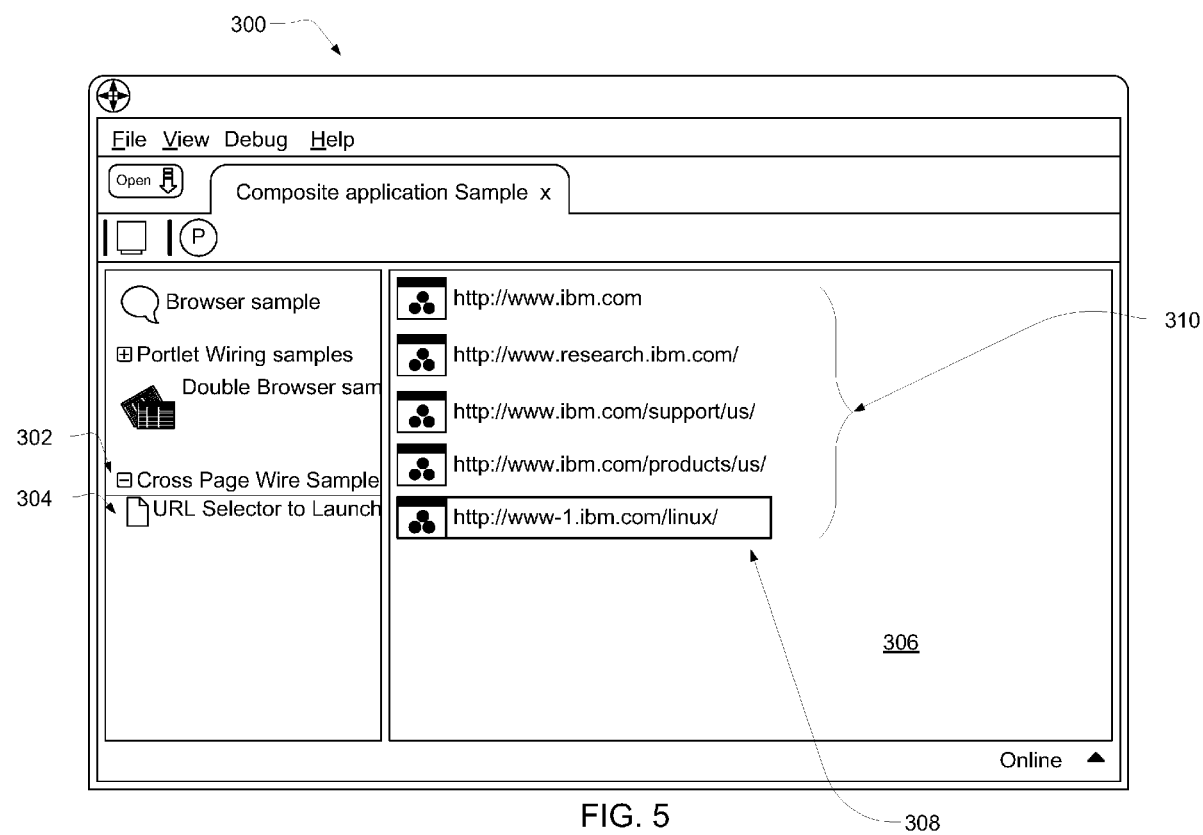
FIG. 5 is a simplified screen shot showing an example of a source component in a source screen.

FIG. 5 is a simplified screen shot 300 showing an example of a source component in a source screen 306. In the example of FIG. 5, the source component is a list control component that controls the list of URLs 310, and takes up the whole source screen 306. The user opens the source component 304 in the source screen 306 under the Cross Page Wire Sample 302, and then double clicks on a URL 308 in the URL list 310, thus causing URL 308 to become the currently selected URL in list 310. The currently selected URL in the list 310 is a property that is wired to a target component shown in FIG. 6. As the currently selected URL in the list 310 changes, the newly selected URL (e.g. URL 308) is published to the target component on the target screen of FIG. 6.

Figure 6:
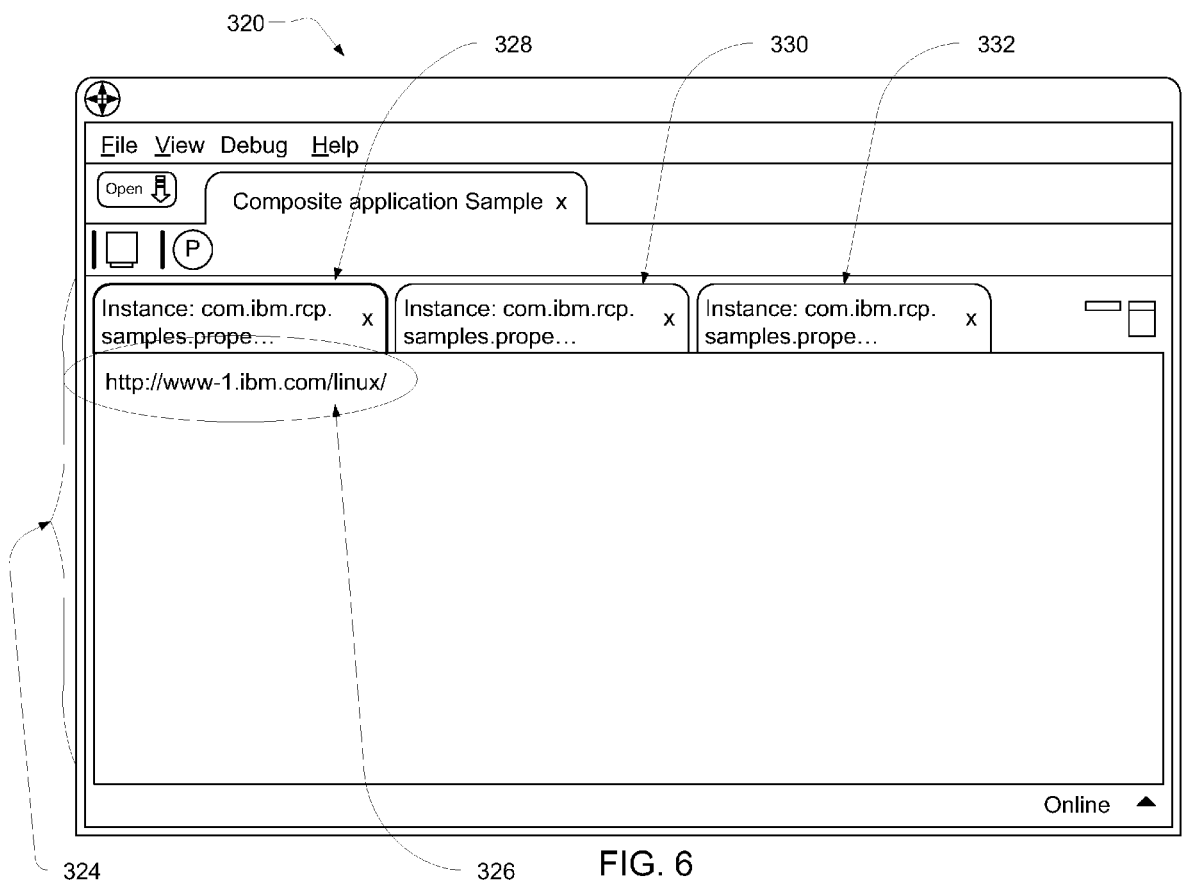
FIG. 6 is a simplified screen shot showing an example of a target component in a target screen.

As shown in FIG. 6, a simplified screen shot 320 includes a target screen 324 including three tabbed components 328, 330 and 332. In response to a change in the currently selected URL in the list 310 of FIG. 5, the new currently selected URL is passed to the tabbed component 328, which is the target component for the cross-page wire, and which is located within the target screen 324. The property change event resulting from the new URL being selected by the user causes the cross-page wire to be executed such that target screen 324 obscures the source screen 306 of FIG. 5, the target component 328 is made current in the target screen 324, and the new property value 326 sent to the target component 328 is displayed by the target component 328.

While in the disclosed system may be embodied such that the components connected by the disclosed cross-page wires are Web based portlets located in different pages of a Web portal system, the disclosed system is not so limited. Accordingly, those skilled in the art should recognize that the disclosed cross-page wires may be used to connect software components of any specific type within any specific type of composite application program. Moreover, the properties linked between the disclosed cross-page wires may be exposed for linking through any appropriate technique. For example, in one embodiment, the properties linked by the disclosed cross-page wires may be exposed for linking in cross-page wires in WSDL (Web Services Definition Language) associated with components in the composite application.

The disclosed system provides many advantages over previous solutions. First, the cross-page wires provided by the disclosed system enable linking of similarly typed properties between components located on different screens, whereas previous solutions were limited to linking components within a single screen. In some cases the disclosed system may advantageously be used so that pop-up windows or the like that would otherwise be needed are eliminated. This may be advantageous in some cases, for example for security purposes.

While the above description regarding illustrative embodiments of the disclosed system includes examples of specific user interface display objects, such as graphical buttons and the like, the present invention is not limited to those specific examples. Accordingly, those skilled in the art will recognize that alternative embodiments may use any specific type or kind of user interface display object that may be appropriate.

The disclosed system can take the form of an entirely software embodiment, an entirely hardware embodiment, or an embodiment containing both software and hardware elements. The figures include block diagram and flowchart illustrations of methods, apparatus(s) and computer program products according to an embodiment of the invention. It will be understood that each block in such figures, and combinations of these blocks, can be implemented by computer program instructions. These computer program instructions may be loaded onto a computer or other programmable data processing apparatus to produce a machine, such that the instructions which execute on the computer or other programmable data processing apparatus create means for implementing the functions specified in the block or blocks. These computer program instructions may also be stored in a computer-readable memory or other computer readable medium that can direct a computer or other programmable data processing apparatus to function in a particular manner, such that the instructions stored in the computer-readable memory or other medium to produce an article of manufacture including instruction means which implement the function specified in the block or blocks. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions specified in the block or blocks.

Those skilled in the art should readily appreciate that programs defining the functions of the present invention can be delivered to a computer in many forms; including, but not limited to: (a) information permanently stored on non-writable storage media (e.g. read only memory devices within a computer such as ROM or CD-ROM disks readable by a computer I/O attachment); (b) information alterably stored on writable storage media (e.g. floppy disks and hard drives); or (c) information conveyed to a computer through communication media for example using wireless, baseband signaling or broadband signaling techniques, including carrier wave signaling techniques, such as over computer or telephone networks via a modem.

While the invention is described through the above exemplary embodiments, it will be understood by those of ordinary skill in the art that modification to and variation of the illustrated embodiments may be made without departing from the inventive concepts herein disclosed.

We claim:

1. A method for cross-screen component communication in a dynamically created composite application, comprising:
   receiving mark-up for a source component on a source screen in a composite application, wherein said source component includes meta-data indicates a target component located on a target screen;
   generating an executable object based on said meta-data in said mark-up for said source component, wherein said executable object is associated with a property in said source component, wherein said executable object includes an identifier of said target screen on which said target component is located;
   determining, at run time for said composite application, that a current value of said property in said source component has changed; and
   executing, responsive to said determination that said current value of said property in said source component has changed, said executable object, wherein said executing of said executable object includes determining said identifier of said target screen on which said target component is located, changing a current perspective associated with said composite application from displaying said source screen with said source component to displaying said target screen with said target component, and conveying said changed current value of said property to said target component.

2. The method of claim 1, further comprising:
   wherein said target component processes said changed current value of said property by changing a current display of said target component in said target screen to reflect said changed current value of said property.

3. The method of claim 1, further comprising:
   providing, after deployment of said source component and said target component, a cross-page connection definition user interface display object, wherein said cross-page connection definition user interface display object enables a user to indicate identifiers for said source component, said source screen, said target component, and said target screen; and
   generating, responsive to said user indicated identifiers for said source component, said source screen, said target component, and said target screen, said mark-up for said source component.

4. The method of claim 1, wherein said mark-up for said source component comprises extensible mark-up language (XML) mark-up.

5. The method of claim 1, wherein said source screen and said target screen comprise different Web pages.

6. The method of claim 1, wherein said source screen and said target screen comprise different tab display objects within a tabbed user interface provided by said composite application.

7. The method of claim 1, wherein said source component and said target component comprise different portlets.

8. The method of claim 1, wherein said source component and said target component comprise different documents currently opened within said composite application.

9. The method of claim 1, wherein said property in said source component has the same declared data type as a corresponding property in said target component into which said new current value is stored in response to said determination that said current value of said property in said source component has changed.

10. A computer system including a computer readable storage medium, said computer readable storage medium having computer program code stored thereon for cross-screen component communication in a dynamically created composite application, wherein said program code, when executed, causes said computer system to:
   receive mark-up for a source component on a source screen in a composite application, wherein said source component includes meta-data indicates a target component located on a target screen;
   generate an executable object based on said meta-data in said mark-up for said source component, wherein said executable object is associated with a property in said source component, wherein said executable object includes an identifier of said target screen on which said target component is located;
   determine, at run time for said composite application, that a current value of said property in said source component has changed; and
   execute, responsive to said determination that said current value of said property in said source component has changed, said executable object, wherein execution of said executable object includes determining said identifier of said target screen on which said target component is located, changing a current perspective associated with said composite application from displaying said source screen with said source component to displaying said target screen with said target component, and conveying said changed current value of said property to said target component.

11. The system of claim 10, further comprising:
   wherein said target component processes said changed current value of said property by changing a current display of said target component in said target screen to reflect said changed current value of said property.

12. The system of claim 10, wherein said program code, when executed, further causes said computer system to:
   provide, after deployment of said source component and said target component, a cross-page connection definition user interface display object, wherein said cross-page connection definition user interface display object enables a user to indicate identifiers for said source component, said source screen, said target component, and said target screen; and generate, responsive to said user indicated identifiers for said source component, said source screen, said target component, and said target screen, said mark-up for said source component.

13. The system of claim 10, wherein said mark-up for said source component comprises extensible mark-up language (XML) mark-up.

14. The system of claim 10, wherein said source screen and said target screen comprise different Web pages.

15. The system of claim 10, wherein said source screen and said target screen comprise different tab display objects within a tabbed user interface provided by said composite application.

16. The system of claim 10, wherein said source component and said target component comprise different portlets.

17. The system of claim 10, wherein said source component and said target component comprise different documents currently opened within said composite application.

18. The system of claim 10, wherein said property in said source component has the same declared data type as a corresponding property in said target component into which said new current value is stored in response to said determination that said current value of said property in said source component has changed.

19. A computer program product including a computer readable storage medium, said computer readable storage medium having computer program code stored thereon for cross-screen component communication in a dynamically created composite application, wherein said program code, when executed, causes a computer system to:

receive mark-up for a source component on a source screen in a composite application, wherein said source component includes meta-data indicates a target component located on a target screen;

generate an executable object based on said meta-data in said mark-up for said source component, wherein said executable object is associated with a property in said source component, wherein said executable object includes an identifier of said target screen on which said target component is located;

determine, at run time for said composite application, that a current value of said property in said source component has changed; and execute, responsive to said determination that said current value of said property in said source component has changed, said executable object, wherein said executing of said executable object includes determining said identifier of said target screen on which said target component is located, changing a current perspective associated with said composite application from displaying said source screen with said source component to displaying said target screen with said target component, and conveying said changed current value of said property to said target component.

* * * * *